(No Model.)

C. & E. HINSHAW.
BELT SUPPORTER.

No. 323,679. Patented Aug. 4, 1885.

WITNESSES
Maurice Delmar.
F. L. Ourand.

INVENTOR
Columbus Hinshaw
Elwood Hinshaw
By Louis Bagger + Co.,
Attorneys.

UNITED STATES PATENT OFFICE.

COLUMBUS HINSHAW AND ELWOOD HINSHAW, OF SNOW HILL, INDIANA.

BELT-SUPPORTER.

SPECIFICATION forming part of Letters Patent No. 323,679, dated August 4, 1885.

Application filed June 12, 1885. (No model.)

*To all whom it may concern:*

Be it known that we, COLUMBUS HINSHAW and ELWOOD HINSHAW, both residents of Snow Hill, in the county of Randolph and State of Indiana, have invented certain new and useful Improvements in Belt-Supporters; and we do hereby declare that the following is a full, clear, and exact description of the invention, which will enable others skilled in the art to which it appertains to make and use the same, reference being had to the accompanying drawings, which form a part of this specification, and in which—

Figure 1:
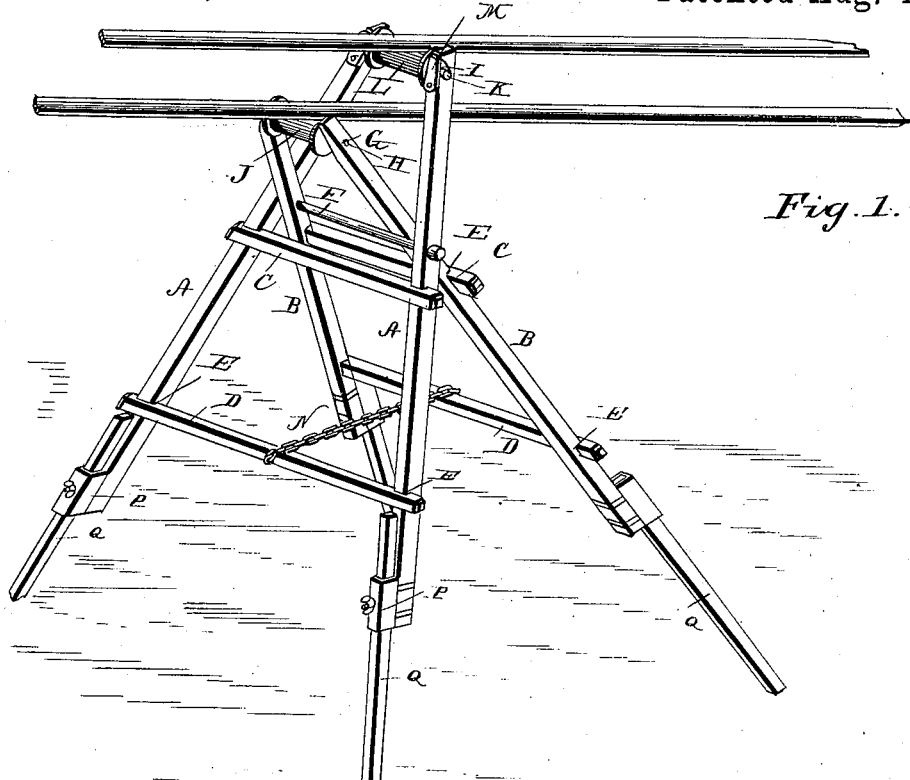
Figure 2:
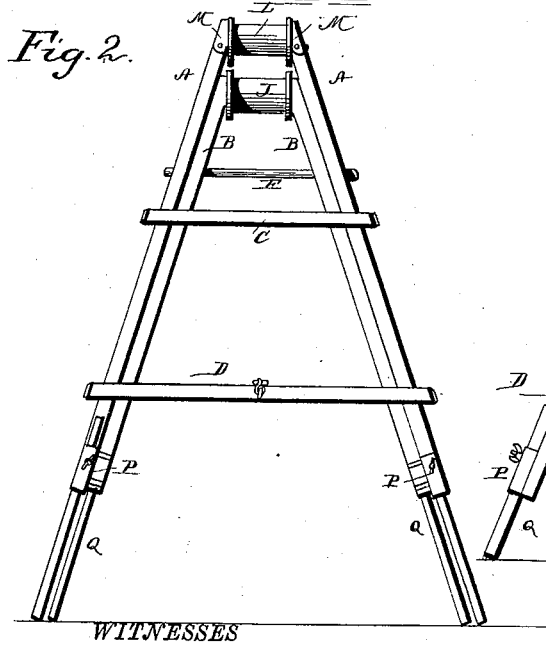
Figure 3:
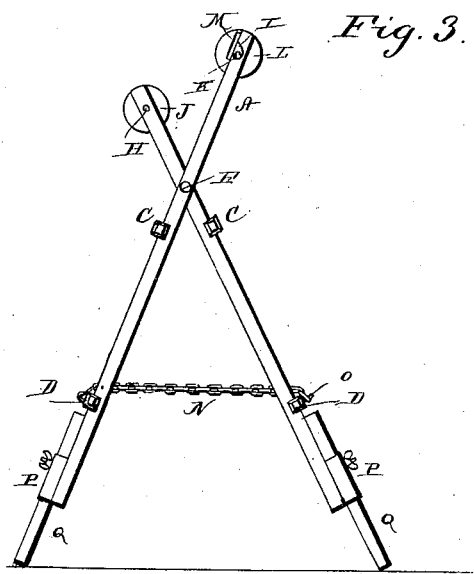

Figure 1 is a perspective view of our improved supporter for machine-belts, showing it in operation. Fig. 2 is a side view, and Fig. 3 is an end view.

Similar letters of reference indicate corresponding parts in all the figures.

Our invention has relation to supporters for long machine-belts—such as belts used in portable or stationary thrashing-machines or other agricultural machines; and it consists in the improved construction and combination of parts of the same, as hereinafter more fully described and claimed.

In the accompanying drawings, the letters A A and B B indicate two pairs of diverging legs, one pair somewhat longer than the other. Each pair of these legs are connected by means of two cross-pieces, C and D, which are detachably secured, with their ends resting in notches E in the outer faces of the legs. The two pairs of legs cross each other near their upper ends, and are connected and pivoted to each other by means of a rod, F, passing transversely through the legs. The upper ends of the shorter legs form bearings G, in which the ends of the shaft H of a flanged pulley, J, are journaled, and the upper ends of the longer legs are formed with two notches or open bearings, I, in which the ends of the shaft K of a flanged pulley, L, are journaled, the said notches or bearings having latches or removable caps M, which cover their open sides and confine the ends of the shaft.

A chain, N, is secured to one of the lower cross-pieces connecting the legs, and may be engaged by a pin or bolt, O, upon the lower cross-piece of the other pair of legs, so that by adjusting the links of the chain upon this pin the legs may be held together closer to or farther from each other, as desired.

The lower ends of the legs are provided with staples or sleeves P, in which extensions Q slide, and may be adjusted by any suitable means, so that by means of these extensions the length of the legs may be adjusted according to the character of the ground upon which the device is placed.

When the device is in operation, the legs are adjusted in length so as to cause the device to stand level, whereupon the legs are adjusted by means of the chain, so as to raise the pulley at the ends of the shorter pair of legs to bear against the under side of the lower portion of the belt, the pulley at the longer legs having been removed so as to enable the ends of the said legs to pass up on both sides of the lower portion of the belt. The pulley is now inserted into its bearings in the longer legs and supports the upper portion of the belt, bearing against its under side, and the pulleys will in this manner assist in carrying the weight of the belt, which in long belts is rather considerable and causes much wear upon the journals of the shafts carrying the pulleys over which the belt passes, besides the shaking and draft upon the machines connected by the belt. The pulleys will also prevent the belt from being forced off the pulleys by high wind or any similar cause, the flanges of the pulleys serving to keep the belt running true.

When not in operation, the rod may be drawn out which connects and pivots the legs to each other, the pulleys removed, and the cross-pieces taken out of their notches, when the entire device may be packed in a very small space.

The operation and advantages of our device will be readily seen from the foregoing description, taken in connection with the accompanying drawings, without any further explanation.

Having thus described our invention, we claim and desire to secure by Letters Patent of the United States—

1. A belt-supporting device consisting of two diverging pairs of legs having pulleys journaled in their upper ends, and having means for adjusting the lower ends of the legs at different distances from each other, as and for the purpose shown and set forth.

2. A belt-supporting device consisting of two diverging pairs of legs of unequal length having pulleys journaled in their upper ends, the pulley of the longer pair of legs being removable, and having means for adjusting the legs at different angles of divergence, as and for the purpose shown and set forth.

3. In a belt-supporting device, the combination of a pair of longer legs having a pulley journaled removably in their upper ends, a pair of shorter legs having a pulley journaled in their upper ends, cross-pieces connecting the legs, a rod traversing the legs near their upper ends connecting them pivotally, and a chain secured at one end to one of the cross-pieces of one pair of legs and engaging a pin upon a cross-piece of the other pair of legs, as and for the purpose shown and set forth.

4. In a belt-supporting device, the combination of a pair of longer legs connected by cross-pieces, and having notches or open bearings in their upper ends provided with caps for closing them, a pair of shorter legs formed with bearings at their upper ends and connected by cross-pieces, pulleys journaled in the said bearings, a rod passing transversely through the legs near their upper ends, connecting them and pivoting them to each other, and a chain attached to the cross-piece of one pair of legs and engaging a pin upon the cross-piece of the other pair of legs, as and for the purpose shown and set forth.

5. A belt-supporting device consisting of legs having notches in their outer faces, one pair longer than the other, and formed with bearings in their upper ends, cross-pieces fitting removably in the notches of the legs, pulleys journaled in the bearings of the legs, a rod passing transversely through the legs near their upper ends, connecting them pivotally, and a chain attached at one end to one of the cross-pieces of one pair of legs, and engaging a pin upon a cross-piece of the other pair of legs, as and for the purpose shown and set forth.

6. In a belt-supporting device consisting of two pairs of diverging legs provided with pulleys at their upper ends and adjusted at their lower ends by means of a chain attached to one pair of legs and engaging a pin upon the other pair of legs, the combination, with the said legs having staples or sleeves at their lower ends, of extensions fitting in the said staples or sleeves, and means for adjusting the extensions in the said staples or sleeves, as and for the purpose shown and set forth.

In testimony that we claim the foregoing as our own we have hereunto affixed our signatures in presence of two witnesses.

COLUMBUS HINSHAW.
ELWOOD HINSHAW.

Witnesses:
ISAIAH P. WATTS,
FREMONT GARRETT.